United States Patent
Sinn

(10) Patent No.: US 6,732,089 B1
(45) Date of Patent: May 4, 2004

(54) SQL ACCESS TO SYSTEM SPECIFIC DATA

(75) Inventor: Richard Pong Nam Sinn, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,959

(22) Filed: May 9, 2000

(51) Int. Cl.[7] ............................. G06F 17/30; G06F 7/00
(52) U.S. Cl. ........................................................ 707/3
(58) Field of Search .................................. 707/1, 3, 10

(56) References Cited

U.S. PATENT DOCUMENTS

| | | | | |
|---|---|---|---|---|
| 5,600,833 A | | 2/1997 | Senn et al. ............... 395/601 |
| 5,615,337 A | * | 3/1997 | Zimowski et al. ............ 707/3 |
| 5,713,018 A | | 1/1998 | Chan ....................... 395/610 |
| 5,794,229 A | | 8/1998 | French et al. ................ 707/2 |
| 5,842,205 A | * | 11/1998 | Brann ......................... 707/4 |
| 5,899,990 A | | 5/1999 | Maritzen et al. .............. 707/4 |
| 5,937,415 A | | 8/1999 | Sheffield et al. ........... 707/204 |
| 5,950,188 A | | 9/1999 | Wildermuth .................. 707/3 |
| 6,006,224 A | * | 12/1999 | McComb et al. ........... 707/102 |
| 6,102,969 A | * | 8/2000 | Christianson et al. ........ 707/10 |
| 6,135,650 A | * | 10/2000 | Goebel ...................... 717/143 |
| 6,327,629 B1 | * | 12/2001 | Wang et al. .................. 714/47 |
| 6,370,681 B1 | * | 4/2002 | Dellarocas et al. ......... 717/100 |

* cited by examiner

*Primary Examiner*—Greta Robinson
*Assistant Examiner*—Susan Rayyan
(74) *Attorney, Agent, or Firm*—Janaki K. Davda; Konrad, Raynes & Victor LLP

(57) ABSTRACT

A method, apparatus and program storage device for enabling SQL statement access to remote system specific data and functions is provided. A method is developed to utilize wrapper stored procedures and the table formatted output of native commands in order to access the output via direct SQL statements. The output of native commands is generated by wrapper stored procedures and then directed to a temporary file by the method. The client may then access the contents of the file with direct SQL queries. This procedure allows the transformed access procedure to perform more efficiently than conventional procedures, while providing same results.

31 Claims, 5 Drawing Sheets

SQL ACCESS TO SYSTEM SPECIFIC DATA

BACKGROUND OF THE INVENTION

1. Field of the Invention

This invention relates in general to database management systems performed by computers, and in particular to a remote data access technique utilizing a stored procedure wrapper, wherein system specific data and subroutines may be accessed using SQL.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together, to perform complex sets of procedures with a single statement.

Although SQL is standard to some degree across a number of platforms, including Windows NT, Windows 95, AIX, OS/390 and AS/400, there remains platform specific information that can not be obtained using SQL. Native commands are commands that run only on a specific platform and that cannot be utilized by SQL in conventional approaches. An example of a native command is "DSPFD FILE," which displays a file description for obtaining file member information on an AS/400 platform. Other examples include "ps -aux" for processing information running on an AIX machine and "SET" for displaying Windows environment information on a Windows NT system. These native commands obtain platform specific information that cannot be directly obtained with SQL.

One conventional approach for utilizing system specific routines utilizing SQL is Remote Procedure Call (RPC). RPC is generally a mechanism for allowing subroutines to execute on a remote system across a network. FIG. 1 depicts the difference between a traditional direct procedure call 101 and a remote procedure call 103.

The code that enables RPC to access remote systems is broken into four components, shown in FIG. 2. The client stub 201 and server stub 203 are compiled C language source files specific to the procedures being sent across the network. The client runtime 205 and server mainline 207 are generic. The user of the RPC describes the interface between the main program 209 and the subroutines 211 using an Interface Definition Language (IDL). The RPC compiler then generates the client stub 201 and the server stub 203 based on the IDL description. Common interface definition languages are Sun's NIDL and the DCE IDL.

Once compiled, the client stub 201 is linked with the client runtime 205 to provide access to the remote procedures that otherwise could not have been accessed with SQL. Similarly, the server stub 203, once compiled, is linked with the server mainline 207 to format commands prior to calling the actual user's subroutines. The RPC code must correctly translate data from the format used by the client to the format used by the server and vice versa. This requirement, in turn, yields the constraint that the client stub 201 must be compatible with the server stub 201. Although RPC is functional in its approach for accessing system specific subroutines, it is limiting in that it requires installation of additional code on both the client and the server systems.

A different conventional approach for accessing system specific information is an SQL stored procedure. With this approach, as detailed in FIG. 3, specific procedure programs 301 are stored on a server 303. The client 305 can then use an SQL statement to invoke the stored procedure on the server side. The process is cumbersome, however. For example, a procedure program 301 must be created and registered using an SQL statement create procedure. The program 301 must then be installed in the server. If, for example, the program 301 is stored on the server 303 at location MYSCH.STRPROC, the client 305 will use the SQL statement: EXEC SQL EXECUTE IMMEDIATE CALL MYSCH.STRPROC to invoke the stored procedure 301 on the server side 303. The stored procedure 301 then executes native commands to obtain system specific data and the results are passed back. The client SQL call statement 305 must match the signature of the stored procedure 301. This approach, much like the previously described conventional approach, requires installation of additional code on the server side every time a new client function is required.

SUMMARY OF THE INVENTION

It is an object of the present invention to provide a method and system for accessing system specific data without the installation of additional server side code. It is a further object of the invention to provide a method that does not require installation of additional client side code in cases that involve separate requests for the same system specific information. The method of the invention is less complex than conventional methods and results in lower software maintenance costs.

One embodiment of the present invention includes a method of using SQL to access system specific information and functions in a computer system. The method utilizes table formatted native command output files as well as "wrapper" stored procedures for running native commands and accessing system specific information through SQL. The method does not require installation of additional code on the server time for each new client function request.

Another preferred embodiment of the present invention is a computer system for optimizing an SQL query to system specific information, utilizing the above-described method embodiment of the present invention.

Yet another preferred embodiment of the present invention is a program storage device readable by a computer tangibly embodying a program of instructions executable by the computer to perform the above-mentioned method embodiment of the present invention.

The foregoing and other objects, features, and advantages of the present invention will be apparent from the following detailed description of the preferred embodiments, which makes reference to several drawing figures.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

The present invention discloses a method, apparatus and program storage device for optimizing the performance of remote system specific data and functions using SQL statements. The optimized data query technique utilizes a new method that takes advantage of table formatted native command outputs as well as wrapper stored procedures in order to access system specific data using SQL without the need for installation of additional server side code.

Figure 1:
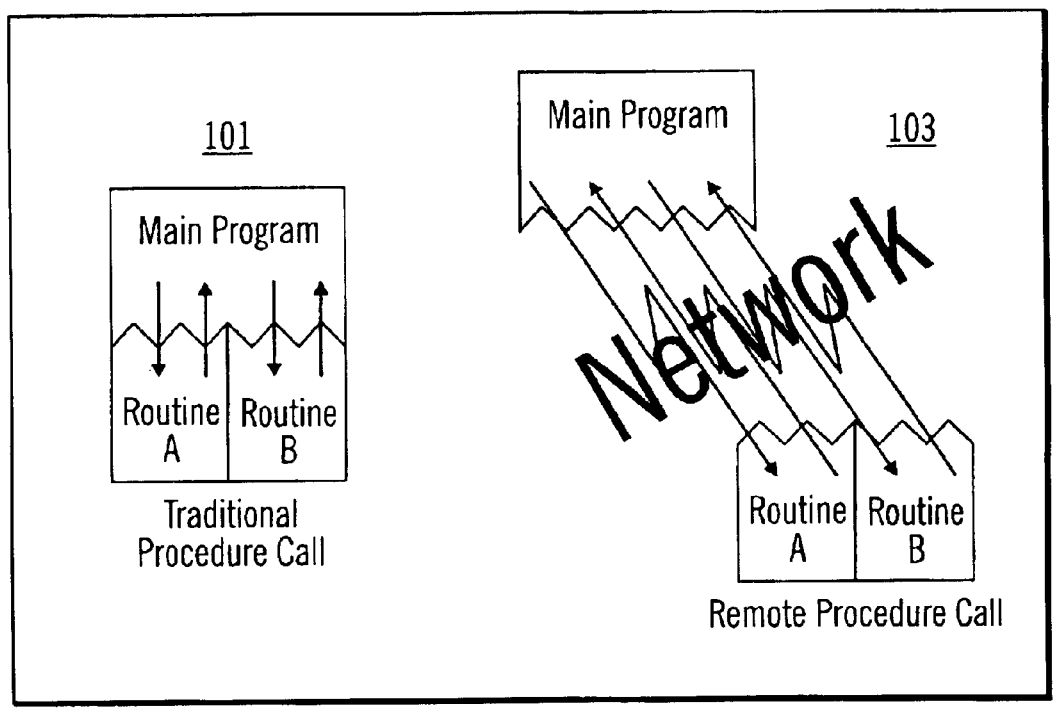
FIG. 1 illustrates the traditional procedure call and the Remote Procedure Call (RPC), according to the prior art.
Figure 2:
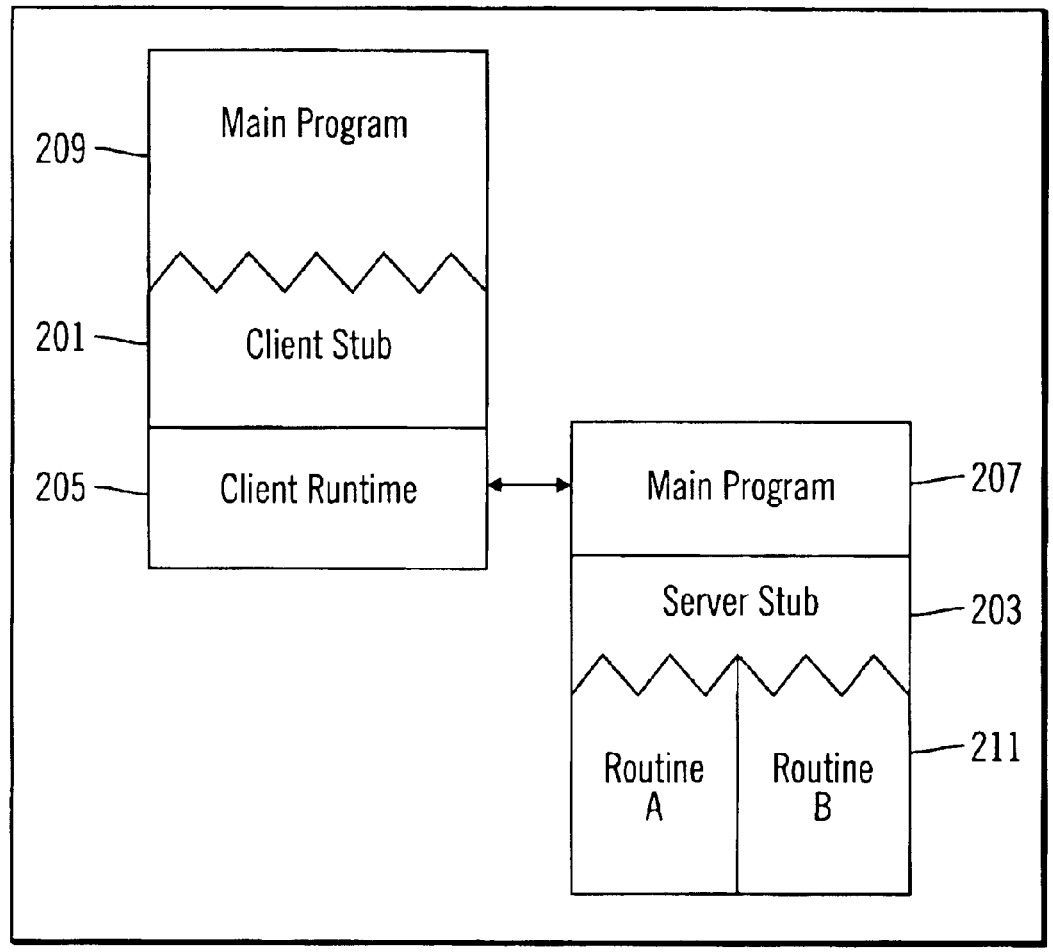
FIG. 2 illustrates further details of the RPC, according to the prior art.
Figure 3:
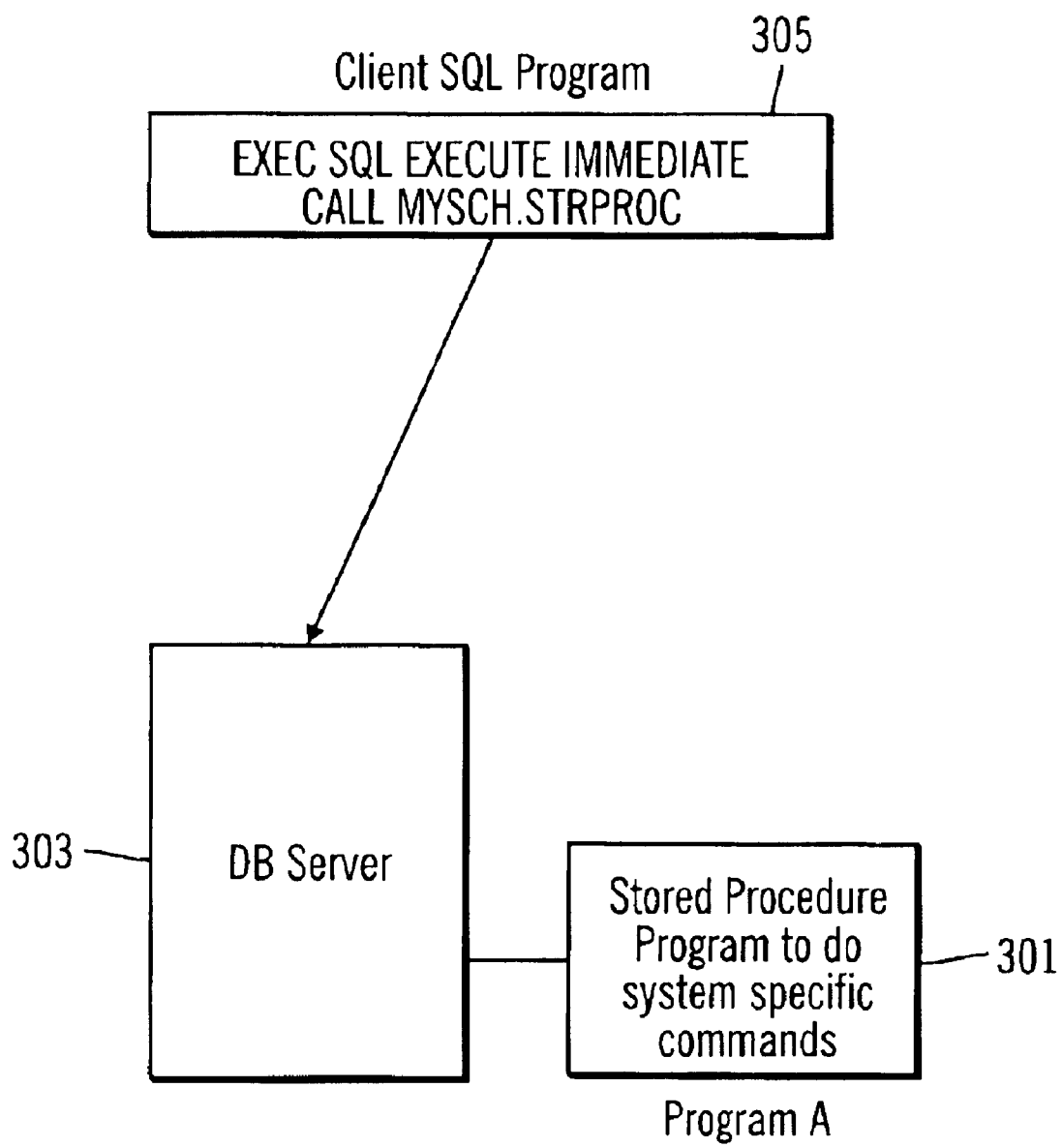
FIG. 3 illustrates an SQL stored procedure, according to the prior art.
Figure 4:
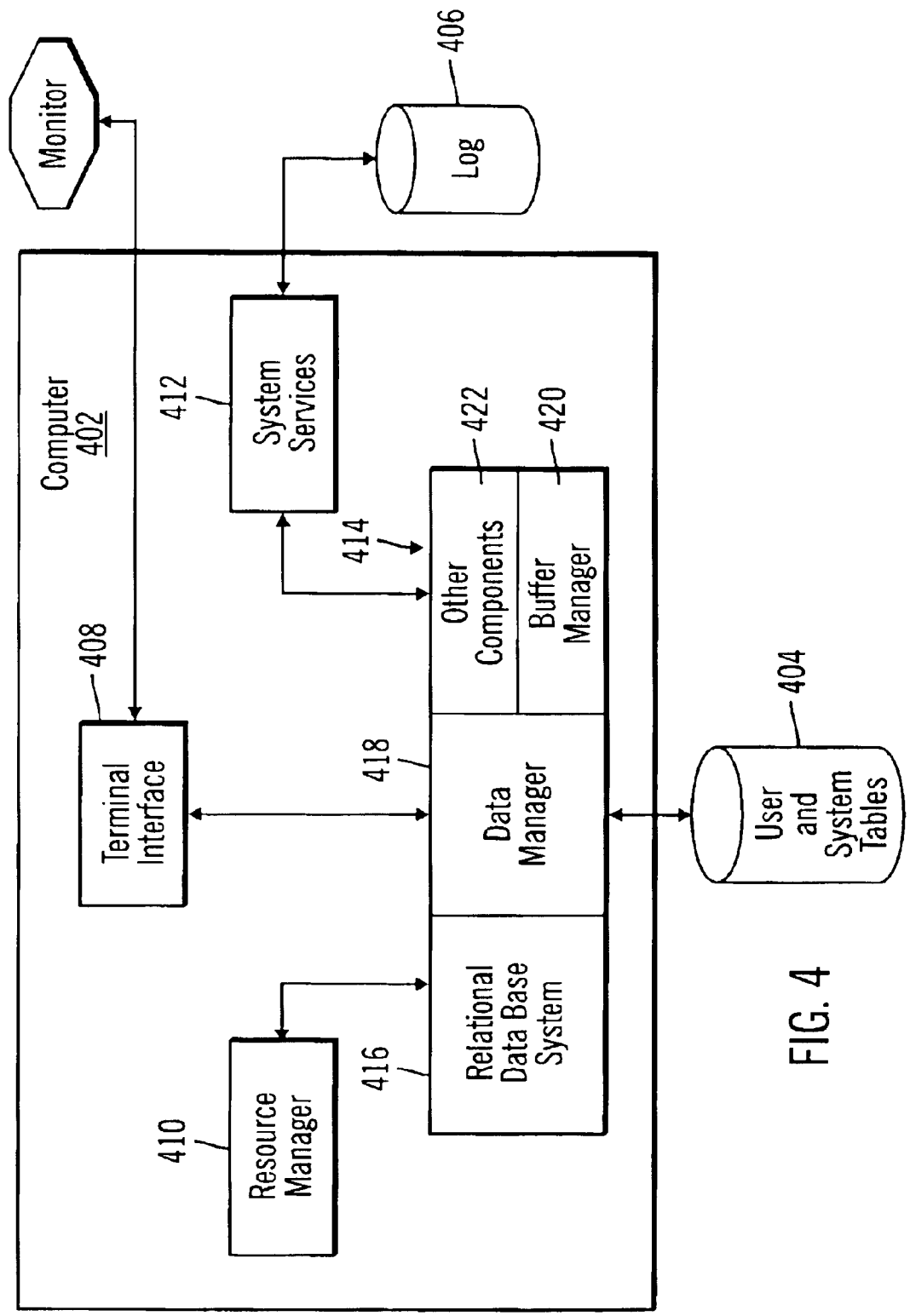
FIG. 4 illustrates a computer database hardware and software environment usable in the present invention.

FIG. 4 illustrates an exemplary computer hardware environment, including a computer system 402, comprising one or more processors executing instructions stored in its associated computer memory, that could be used with the present invention. The operating memory can be loaded with the instructions received through an optional storage drive or through an interface with the network. In one exemplary environment, the access technique of the present invention is utilized on the same processor site that the system specific data is stored on. However, the technique is especially advantageous when used in a network environment, having at least a database server site with a database processor networked to a client site with a client processor.

Each processor is connected to one or more electronic storage devices, such as user and system files 404, log 406, and disk drives, that store one or more databases. These drives may comprise, for example, optical disk drives, magnetic tapes and/or semiconductor memory. The storage drive permits receipt of a program storage device, such as a magnetic media diskette, magnetic tape, optical disk, semiconductor memory and other machine-readable storage device, and for program steps recorded on the program storage device to be read and transferred into the computer memory. The recorded program instructions may include the code for the optimized access technique of the present invention. Alternatively, the program steps can be received into the operating memory or over the network.

Operators of the computer system 402 use a standard operator terminal interface 408, such as IMS/DB/DC, CICS, TSO, OS/2 or other similar interface, to transmit electrical signals to and from the computer system 402, that represent commands for performing various search and retrieval functions, termed queries, against the databases. In the present invention, these queries conform to the Structured Query Language (SQL) standard, and invoke functions performed by Relational DataBase Management System (RDBMS) software. In certain preferred embodiment of the present invention, the RDBMS software comprises the DB2 product offered by IBM. Those skilled in the art will recognize, however, that the present invention has application to any RDBMS software that uses SQL, and may similarly be applied to non-SQL queries.

As illustrated in FIG. 4 the DB2 architecture includes three major components: the Resource Lock Manager (IRLM) 410, the Systems Services module 412, and the Database Services module 414. The IRLM 410 handles locking services, because DB2 treats data as a shared resource, thereby allowing any number of users to access the same data simultaneously, and thus concurrency control is required to isolate users and to maintain data integrity. The Systems Services module 412 controls the overall DB2 execution environment, including managing log data sets on the electronic storage device 406, gathering statistics, handling startup and shutdown, and providing management support.

At the center of the DB2 architecture is the Database Services module 414. The Database Services module 414 contains several submodules, including the Relational Database System (RDS) 416, the Data Manager 418, the Buffer Manager 420 and other components 422, such as an SQL compiler/interpreter. These submodules support the functions of the SQL language, i.e., definition, access control, retrieval, and update of user and system data. The Database Services module 414 preferably comprises one or more processors that execute a series of computer-executable programming instructions to respond to a user query or access call to system specific data or operations.

The access technique of the preferred embodiments of the present invention may be utilized on the same processor site where the application table is stored. However, the technique is especially advantageous when used in a network environment. In a network environment the client site calls a "wrapper" stored procedure from the database server site. Output from the execution of the procedure is directed to a temporary file, readable by SQL, which the client can then directly access using SQL. This method, which provides system specific data in an SQL readable format, eliminates the need for additional code to be placed on either the client or the server side for individual queries and access attempts. The present invention ideally works with any heterogeneous sources supported by IBM, such as AS/400, that inherently provide SQL readable native procedure outputs as well as wrapper stored procedures.

Figure 5:
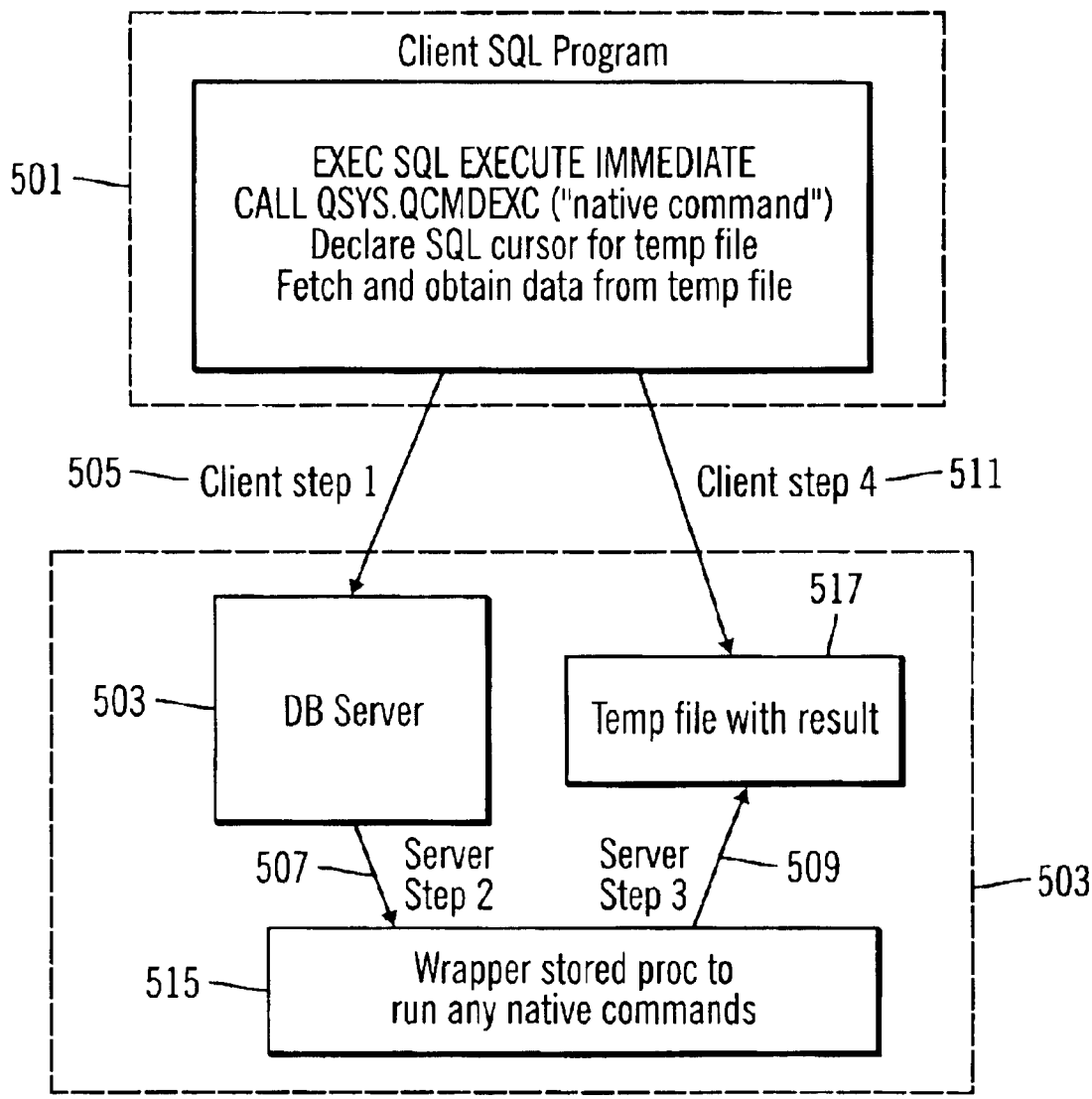
FIG. 5 illustrates a method exemplary of the method of the present invention.

An embodiment of the present invention may be a method, as illustrated in FIG. 5. The method, comprising 4 steps, directs the exchange between a client 501 and a server 503 wherein the client 501 uses SQL to access system specific data or functions on a server 503. In client step 1 505 the client calls a wrapper stored procedure, with the native command passed as the parameter, on the database server 503. The wrapper stored procedure to run any native commands 515 is an SQL stored procedure registered at a particular location on the database server 503 that may be accessed by SQL. The wrapper stored procedure to run any native commands 515 is then run, in server step 2 507 on the server system 503 as a native procedure in the method schematic. In server step 3 509 the results of the native procedure are directed to a temporary file 517. The file is formatted such that it is readable by SQL. This enables the utility of client step 4 511 in which the client 501 may directly access the temporary file 517 which contains the system specific information.

The present invention, which in a preferred embodiment is implemented on an AS/400 platform, provides several important and significant advantages over the prior art. For example, there is no need to install additional code, including server stubs and stored procedures, on the server/database side. This is possible because the AS/400 system provides wrapper stored procedures as well as SQL readable output formats for native procedures.

Other advantages provided by the present invention include reduced complexity in the form of eliminating the need for a conventional client stub in the event that additional clients are required to obtain the same information. Further, the need to keep client/server pairs updated and compatible at all times is eliminated. This directly translates to lower software maintenance costs. Furthermore, upgrade of native commands is independent of the clients. Thus, the native commands can be changed or altered to produce different output fields without affecting the clients, for example, by requiring additional client-side code installation or upgrade. The invention yields a greater degree of separation than that which exists with conventional methods, substantially simplifying software version control between clients and servers. For example, a client does not need to have an exclusive association with a server, and either one may be upgraded or altered without affecting the other.

It will be appreciated by those skilled in the art that the present invention may take the form of various embodiments, including methods that work on a variety of platforms. For example, server platforms other than the AS/400 may be considered to be within the scope of the invention should they include wrapper stored procedures and the ability to output the result of native commands into an SQL readable file. Similarly, the invention may utilize any DB2 platform as its client platform.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for obtaining system specific information using a query language, the method comprising:
    providing a system specific procedure available to a client;
    said system specific procedure executing at least one native command,
    wherein the native command is passed as a parameter to the system specific procedure;
    wherein the system specific procedure is a wrapper stored procedure;
    said execution producing at least a result; and
    inserting said execution result in a file available for the client access.

2. The method according to claim 1, further comprising: providing said execution result from said file to said client in response to a query.

3. The method according to claim 2, wherein the query is an SQL query.

4. The method according to claim 3, wherein said wrapper stored procedure is stored at a remote location relative to said client.

5. The method according to claim 4, wherein said remote location is a database server.

6. The method according to claim 1, wherein said file is a temporary file.

7. The method according to claim 1, wherein said file is a remote file relative to the client location.

8. A method for performing remote system-specific data access using a query language, the method comprising:
    calling a wrapper stored procedure from a remote location, said wrapper stored procedure receiving as a parameter a native command native to an operating system platform;
    passing said wrapper stored procedure to said operating system platform;
    executing said wrapper stored procedure on said operating system platform; and
    storing an output of said execution in a file available for client access.

9. The method according to claim 8, further comprising: providing the stored execution output in response to a query.

10. The method of claim 9, wherein said query is an SQL query.

11. The method of claim 8, wherein said operating system platform is on a system that provides wrapper stored procedures as well as SQL readable output formats for native procedures.

12. The method of claim 8, wherein said file is a temporary file.

13. An apparatus for optimizing remote data access, the apparatus comprising:
    a computer having an electronic storage device coupled thereto for storing a database, the access being performed by the computer to retrieve data from said database; and
    a method performed by the computer, said method comprising:
        calling a wrapper stored procedure from said database, said wrapper stored procedure receiving as a parameter a native command native to said database operating system platform;
        passing said wrapper stored procedure to said operating system platform;
        executing said wrapper stored procedure on said operating system platform; and
        storing an output of said execution in a file available for client access.

14. The apparatus according to claim 13, further comprising: providing the execution output from the file in response to a query.

15. The apparatus according to claim 14, wherein the query is an SQL query.

16. The apparatus according to claim 13, wherein said operating system platform is on a system that provides wrapper stored procedures as well as SQL readable output formats for native procedures.

17. The apparatus according to claim 13, wherein said file is a temporary file.

18. A program storage device readable by a computer tangibly embodying a program of instructions executable by the computer to form a method for optimizing remote data access calls, the calls being performed by the computer to retrieve data from a database stored in an electronic storage device coupled to the computer, the method comprising:
    calling a wrapper stored procedure from said database, said wrapper stored procedure receiving as a parameter a native command native to said database operating system platform;
    passing said wrapper stored procedure to said operating system platform;

executing said wrapper stored procedure on said operating system platform; and storing an output of said execution in a file available for client access.

19. The program storage device according to claim 18, further comprising: providing the execution output from said file in response to a query.

20. The program storage device according to claim 19, wherein the query is an SQL query.

21. The program storage device according to claim 18, wherein said file is a temporary file.

22. The program storage device according to claim 19, wherein said operating system platform is on a system that provides wrapper stored procedures as well as SQL readable output formats for native procedures.

23. The program storage device according to claim 18, wherein said execution is enabled by at least one SQL command.

24. A method for accessing system specific data, comprising:

allowing a client to call a wrapper stored procedure stored on a database server, the wrapper stored procedure having a native command passed as a parameter, the wrapper stored procedure accessible by a query language;

performing the wrapper stored procedure as a native procedure on the database server, the native procedure including at least the native command as a parameter;

outputting the results of the wrapper stored procedure in a temporary file;

formatting the temporary file so that it is readable by the query language; and allowing the client to access the temporary file through the query language.

25. The method of claim 24, wherein the query language is Standard Query Language.

26. The method of claim 25, wherein the native command can be performed on a system that provides wrapper stored procedures as well as SQL readable output formats for native procedures.

27. The method of claim 24, wherein the wrapper stored procedure is stored at a remote location relative to the client.

28. A system specific data access device comprising:

a computer specific medium having computer readable program code means embodied therein for causing access to system specific date, the computer readable program code means in the system specific data access device comprising:

Computer readable program code means for causing a computer to allow a client to call a wrapper stored procedure stored on a database server, the wrapper stored procedure having a native command passed a parameter, the wrapper stored procedure accessible by a query language;

Computer readable program code means for causing the computer to perform the wrapper stored procedure as a native procedure on the database server, the native procedure including at least the native command as a parameter;

Computer readable program code means for causing the computer to output the results of the wrapper stored procedure in a temporary file;

Computer readable program code means for causing the computer to format the temporary file so that it is readable by the query language; and Computer readable program code means for causing the computer to access the temporary file through the query language.

29. The system specific data access device of claim 28, wherein the query language is Standard Query Language.

30. The system specific data access device of claim 28, wherein the native command can be performed on a system that provides wrapper stored procedures as well as SQL readable output formats for native procedures.

31. The system specific data access device of claim 28, wherein the wrapper stored procedure is stored at a remote location relative to the client.

* * * * *